United States Patent [19]

Abolins et al.

[11] 4,124,654

[45] Nov. 7, 1978

[54] THERMOPLASTIC MOLDING COMPOSITIONS OF VINYL AROMATIC COMPOUND ALPHA, BETA UNSATURATED CYCLIC ANHYDRIDE COPOLYMERS

[75] Inventors: Visvaldis Abolins, Delmar; Gim F. Lee, Jr., Albany, both of N.Y.

[73] Assignee: General Electric Company, Pittsfield, Mass.

[21] Appl. No.: 477,435

[22] Filed: Jun. 7, 1974

[51] Int. Cl.$^2$ .............................................. C08L 53/02
[52] U.S. Cl. ............................ 260/876 B; 260/876 R; 260/42.18
[58] Field of Search ............................ 260/876 B, 892

[56] References Cited

U.S. PATENT DOCUMENTS

| | | | |
|---|---|---|---|
| 3,231,635 | 1/1966 | Holden et al. | 260/876 B |
| 3,641,212 | 2/1972 | Narayana et al. | 260/876 B |
| 3,660,531 | 5/1972 | Lauchlan et al. | 260/876 B |
| 3,689,596 | 9/1972 | Narayana et al. | 260/876 B |

FOREIGN PATENT DOCUMENTS 1,053,596  1/1967  United Kingdom ................ 260/876 B

*Primary Examiner*—Carman J. Seccuro
*Attorney, Agent, or Firm*—Morgan, Finnegan, Pine, Foley & Lee

[57] ABSTRACT

Novel thermoplastic molding compositions are disclosed which comprise a copolymer of a vinyl aromatic compound with an $\alpha,\beta$-unsaturated cyclic anhydride and a hydrogenated A-B-A block copolymer or a block copolymer of the A'-B'-A' type or an acrylic graft polymerization copolymer with or without a polyphenylene ether resin.

12 Claims, No Drawings

THERMOPLASTIC MOLDING COMPOSITIONS OF VINYL AROMATIC COMPOUND ALPHA, BETA UNSATURATED CYCLIC ANHYDRIDE COPOLYMERS

This invention relates to thermoplastic molding compositions that are based on a copolymer of a vinyl aromatic compound with an α, β-unsaturated cyclic anhydride and a hydrogenated, A-B-A block copolymer or a block copolymer of the A'-B'-A' type or an acrylic graft polymerization copolymer with or without a polyphenylene resin.

BACKGROUND OF THE INVENTION

The term "polyphenylene ether resin" includes a family of polymers well known to those skilled in the art, which are made by a variety of catalytic and non-catalytic processes from the corresponding phenols or reactive derivatives thereof. By way of illustration, certain of the following polyphenylene ethers are discussed in Hay, U.S. Pat. Nos. 3,306,874 and 3,306,875, and in Stamatoff, U.S. Pat. Nos. 3,257,357 and 3,257,358. Also, the Bennett and Cooper patents, U.S. Pat. Nos. 3,639,656, 3,642,699 and 3,661,848 describe processes for the preparation of polyphenylene ethers. Other disclosures relating to processes using metal-amine catalysts are found in Bussink et al, U.S. Pat. Nos. 3,337,499; Blanchard et al, U.S. Pat. Nos. 3,219,626; Laakso et al, U.S. Pat. Nos. 3,342,892; Borman, U.S. Pat. Nos. 3,344,166; Hori et al, U.S. Pat. No. 3,384,619; Faurote et al, U.S. Pat. No. 3,400,217; and disclosures relating to metal based catalysts which do not include amines, are well known from patents such as Wieden et al, U.S. Pat. No. 3,442,885 (copper-amidines); Nakashio et al, U.S. Pat. No. 3,573,257 (metal-alcoholate or phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. All of the patents which are mentioned above are incorporated herein by reference.

The Cizek patent, U.S. Pat. No. 3,383,435 discloses blends of polyphenylene ether resins and styrene resins. The thermoplastic compositions disclosed by Cizek may include rubber-modified styrene resin, as well as crystal polystyrene. The Carmelite, Kramer and Lee, Jr. patent, U.S. Pat. No. 3,787,532, also discloses polyphenylene ether containing compositions. These patents are also incorporated by reference.

U.S. Pat. No. 3,660,531 discloses compositions of a polyphenylene ether styrene resin and a styrene-butadiene-styrene block copolymer. These compositions have a major proportion of polyphenylene ether polymer.

There have been many attempts to upgrade the heat distortion temperature and the impact resistance of vinyl aromatic resins. One approach has been to provide copolymers of the vinyl aromatic compounds with α,β-unsaturated cyclic anhydrides. In the case of styrene-maleic anhydride copolymers, a level of 20% of maleic anhydride increases the heat distortion temperature but the resulting material is very brittle.

Accordingly, it is a principal object to provide improved compositions of vinyl aromatic resins that have higher heat distortion tmperatures and better impact strengths particularly as measured in terms of the Gardner impact tests.

DESCRIPTION OF THE INVENTION

According to the present invention, there is provided a composition that is useful in the manufacture of thermoplastic molded articles. These thermoplastic molding compositions comprise:
 (a) from 40-95 parts by weight, preferably from 40-80 parts by weight of a copolymer of a vinyl aromatic compound and an α,β-unsaturated cyclic anhydride;
 (b) from 5-40 parts by weight, preferably 10-30 parts by weight of a block copolymer selected from the group consisting of:
  i. hydrogenated block copolymers of the A-B-A type wherein prior to hydrogenation; A is a polymerized mono-alkenyl aromatic hydrocarbon block; B is a polymerized conjugated diene hydrocarbon block; the blocks A constituting 2-50 weight percent of the copolymer and the unsaturation of block B having been reduced by hydrogenation.
  ii. block copolymers of the A'-B'-A' type wherein A is a polymerized mono-alkenyl aromatic hydrocarbon block and B' is a polymerized conjugated diene block, the block B' being of higher molecular weight than that of the combined molecular weight of terminal blocks A';
  iii. emulsion graft polymerization product of an acrylic monomer alone or in admixture with a styrene monomer on a rubbery diene homopolymer or styrene-diene copolymer backbone; and
  iv. mixtures of the foregoing; and
 (c) from 0-50 parts by weight, preferably 0-40 parts by weight of a polyphenylene ether resin.

The preferred compositions will include 5-20 parts by weight of the polyphenylene ether resin. The PPO containing compositions will have a ratio of the copolymer of the vinyl compound and the α,β-unsaturated cyclic anhydride to polyphenylene ether resin that is greater than one. The polyphenylene ether resins are preferably of the formula:

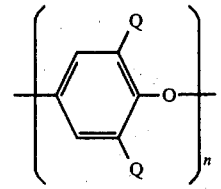

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus, said radicals being free of a tertiary alpha-carbon atom. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly (2,6-dimethyl-1,4-phenylene) ether (each Q is methyl).

The copolymers of the vinyl aromatic compounds and the $\alpha, \beta$-unsaturated cyclic anhydride are well known and are described in the literature. The vinyl aromatic component may be derived from compounds of the formula:

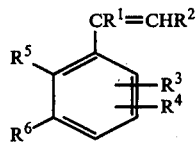

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound. The $\alpha, \beta$-unsaturated cyclic anhydrides include maleic anhydride, citraconic anhydride, itaconic anhydride, aconitic anhydride and the like. The preferred $\alpha, \beta$-unsaturated cyclic anhydride is maleic anhydride.

These polymers may comprise 40 to 1 mole percent of the $\alpha, \beta$-unsaturated cyclic anhydride and from 60 to 99 mole percent of a vinyl aromatic compound. The preferred polymers will contain about 25-5 mole percent of the $\alpha, \beta$-unsaturated cyclic anhydride and 75-95 mole percent of the vinyl aromatic compound. The preparation of these copolymers are described in U.S. Pat. Nos. 2,971,939; 3,336,267 and 2,769,804 which are hereby incorporated by reference.

With respect to the hydrogenated block copolymers of the A-B-A type, they are made by means known in the art and they are commercially available.

These materials are described in U.S. Pat. No. 3,421,323 to Jones, which is hereby incorporated by reference.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene and the like or mixtures thereof. The end blocks may be the same or different. The center block may be derived from, for example, polyisoprene or polybutadiene.

The ratio of the copolymers and the average molecular weights can vary broadly although the molecular weight of center block should be greater than that of the combined terminal blocks. It is preferred to form terminal blocks A having average molecular weights of 4,000–115,000 and center block B e.g., a polybutadiene block with an average molecular weight of 20,000–450,000. Still more preferably, the terminal blocks have average molecular weights of 8,000–60,000 while the polybutadiene polymer blocks has an average molecular weight between 50,000 and 300,000. The terminal blocks will preferably comprise 2–50% by weight, or more preferably, 5–30% by weight of the total block polymer. The preferred copolymers will be those formed from a copolymer having a polybutadiene center block wherein 35–55%, or more preferably, 40–50% of the butadiene carbon atoms are vinyl side chains.

The hydrogenated copolymers may have the average unsaturation reduced to from 95 to 5% of the original value. It is preferred to have the unsaturation of the center block B reduced to 10%, or more preferably, 5% of its original value.

The block copolymers are formed by techniques well known to those skilled in the art. Hydrogenation may be conducted utilizing a variety of hydrogenation catalysts such as nickel or kieselguhr, Raney nickel, copper chromate, molybdenum sulfide and finely divided platinum or other noble metals on a low surface area carrier.

Hydrogenation may be conducted at any desired temperature or pressure, from atmospheric to 3000 p.s.i.g. the usual range being between 100 and 1000 p.s.i.g. at temperatures from 75° F. to 600° F. for times between 0.1 and 24 hours, preferably from 0.2–8 hours.

Hydrogenated block copolymers such as Kraton G-GXT-0650, Kraton G-GXT-0772 and Kraton G-GXT-0782 from Shell Chemical Company, Polymers Division have been found useable according to this invention.

With respect to the A'-B'-A' block copolymers, they may be made by means well known in the art and are also available commercially from a number of sources.

Block copolymers of vinyl aromatic compounds and conjugated dienes are described in Kennedy, et al Editor, Polymer Chemistry of Synthetic Elastomers, Interscience, Vol. 23, Part II, 1969, pages 553–559. In general, they will be of the A-B-A' type in which the center and end blocks can vary. In the compositions of this invention, the central block B, will preferably be that of a conjugated diene, e.g., butadiene; isoprene; 1,3-pentadiene; 2,3-dimethyl-butadiene, and the like or mixtures of the foregoing. The terminal blocks A and A', will be the same or different, but will always be derived from a vinyl aromatic compound, e.g., sytrene, $\alpha$-methyl styrene, vinyl toluene, vinyl xylene, vinyl napthalene, or mixtures of any of the foregoing. In the most preferred compositions, the block copolymer will have terminal blocks A and A' comprised of polystyrene and center block B comprised of polybutadiene.

The ratio of the comonomers can vary broadly, so long as the molecular weight center block is greater than that of the combined terminal blocks. Preferably, with the above limitation, the molecular weight of the terminal blocks each will range from about 2000 to about 100,000 while that of the center block will range from about 25,000 to about 1,000,000.

The block copolymers are made by an organometallic initiated polymerization process using, for example sodium or lithium metal an organic derivative thereof. The diene monomers can be polymerized with a monofunctional or difunctional initiator, as is described in Kennedy et al, mentioned above.

In one process, the block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer of an organodilithium initiator, e.g., dilithiobutane, dilithiostilbene, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

Full descriptive details of such a process are given in Zelinski, U.S. Pat. No. 3,251,905, incorporated herein by reference.

In another process, the block copolymer is built up sequentially using, e.g., a secondary or tertiary alkyl lithium compound at about 100-2000 parts per million based on the total weight of the monomers and a polymerization temperature in the range 20°-65° C. For example, styrene is dissolved in cyclohexane at 32° C. and treated with 5530 parts per million of secondary butyl lithium. After polymerization is complete, isoprene is injected and polymerization is continued at 55°-57° C. Finally styrene is added and the third block is polymerized. The product can be recovered as described above. Full descriptive details of such a process are given in Holden et al, U.S. Pat. No. 3,231,635. These materials are commercially available as Kraton resins.

The graft polymerization product of an acrylic monomer and a diene rubber preferably comprises (1) from about 20-80% by weight of a backbone polymer of the units of butadiene or butadiene and styrene, wherein the butadiene units are present in quantities of at least 40% by weight of the backbone polymer, (2) 80-20% by weight of an acrylic monomer graft polymerized to (1); said acrylic monomer units being selected from the group consisting of lower alkyl methacrylates, alicyclic methacrylates and alkyl acrylates, and (3) 0 to 60% by weight of a styrene monomer graft polymerized to (1) or (2); sequentially or simultaneously with the polymerization of (2).

The graft polymerization product of an acrylic monomer alone or with styrene monomer and the rubbery diene polymer or copolymer may be prepared by known techniques, typically by emulsion polymerization. They may be formed from a styrene-butadiene copolymer latex and a monomeric material such as methyl methacrylate alone or with another compound having a single vinylidene group copolymerizable therewith, e.g., styrene. For example, in the preparation of a representative material, 85-65 parts by weight of monomeric methyl methacrylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15-35 parts by weight of solids in a styrene-butadiene copolymer latex. The copolymer solids in the latex comprise about 10-50% by weight of styrene and about 90-50% by weight of butadiene and the molecular weight thereof is within the range of about 25,000 to 1,500,000. The copolymer latex of solids in water contains a dispersing agent such as sodium oleate or the like to maintain the copolymer in emulsion. Interpolymerization of the monomer or monomeric mixture with the copolymer solids emulsified in water is brought about in the presence of a free-radical generating catalyst and a polymerization regulator which serves as a chain transfer agent, at a temperature of the order of 15° C. to 80° C. Coagulation of the interpolymerized product is then effected with a calcium chloride solution, for instance, whereupon it is filtered, washed and dried. Other graft copolymers and differing from the above only in the ratio of monomeric material solely or preponderantly of methyl methacrylate to the butadiene-styrene copolymer latex in the presence of which it is polymerized extends from 85-25 parts by weight of the former to 15-75 parts by weight of the latter. These materials may extend in physical properties from relatively rigid compositions to rubbery compositions. A preferred commercially available material is Acryloid KM 611 which is sold by Rohm & Haas. Also, U.S. Pat. Nos. 2,943,074 and 2,857,360, which are incorporated by reference, contain additional information as to the preparation of these materials. A preferred material is described in U.S. Pat. No. 2,943,074, column 4, preparation "D" and converted to emulsified polymer "B" as described therein.

The compositions of this invention will preferably include from 40-80 parts of the copolymer of a vinyl aromatic compound and a $\alpha, \beta$-unsaturated cyclic anhydride, and most preferably from 60-75 parts by weight of this material. The block copolymer of the A-B-A type or A'-B'-A' type, or the acrylic graft polymerization product, will preferably be present at from 10-40 parts by weight and most preferably at 20-30 parts by weight. If employed, the polyphenylene ether resins are preferably present at a level of from 1-40 parts by weight and preferably at a level of from 5-30 parts by weight.

The compositions of the invention may also include reinforcing fillers, such as aluminum, iron or nickel, and the like. and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛ inch).

It is a preferred feature of this invention also to provide flame retardant thermoplastic compositions of vinyl aromatic-$\alpha,\beta$-unsaturated cyclic anhydrides as defined above by modifying said compositions to include a flame-retardant additive in a minor proportion but in an amount at least sufficient to render the composition non-burning or self-extinguishing.

Particular flame retardants which may be used are well known and are described in the literature.

The compositions may be prepared by tumbling the components, extruding the mixed powders into a continuous strand, chopping the strands into pellets and thereafter molding the pellets into the desired shape. These techniques are well known to those skilled in this art and are not a critical feature of the invention.

DESCRIPTION OF THE PREFERRED EMBODIMENTS

The present invention is further illustrated in the following examples which are set forth as further descriptions of the invention, but are not to be construed as limiting the invention thereto.

EXAMPLE I

The compositions listed in Table 1 were prepared by compounding the components on a 28 mm. W.P. extruder at a feed temperature of 550° F., a rear temperature of 570° F., a front temperature of 580° F., and a die temperature of 590° F. The materials were molded on a 3 oz. Newbury injection molding machine at 400° F. cylinder temperature and 130° F. mold temperature. The cycle time was 35 seconds.

TABLE 1

| Sample No. | 1[a] | 2 | 3 | 4 | 5[a] | 6 | 7 | 8 | 9 |
|---|---|---|---|---|---|---|---|---|---|
| Components (parts by weight except where noted) | | | | | | | | | |
| I poly(2,6-dimethyl-1,4-phenylene) ether (PPO General Electric Co.) | — | — | 10 | 10 | 10 | — | — | 10 | 10 |
| II A-B-A block copolymer[b] | 20 | 30 | 20 | 30 | 30 | — | — | — | — |
| III A'-B'-A' block copolymer[c] | — | — | — | — | — | 20 | 30 | 20 | 30 |
| IV styrene-maleic anhydride copolymer[d] | 80 | 70 | 70 | 60 | — | 80 | 70 | 70 | 60 |
| V homopolystyrene[e] | — | — | — | — | 60 | — | — | — | — |
| VI rubber modified styrene-maleic anhydride copolymer[f] | — | — | — | — | — | — | — | — | — |
| VII emulsion graft polymerization product of an acrylic monomer on a rubbery diene polymer[g] | — | — | — | — | — | — | — | — | — |
| Sample No. | 10[a] | 11[a] | 12[a] | 13[a] | 14 | 15 | 16 | 17 | 18[a] |
| I | 10 | — | — | — | — | — | 10 | 10 | 10 |
| II | — | — | — | — | — | — | — | — | — |
| III | 30 | — | — | — | — | — | — | — | — |
| IV | — | 100% | — | — | 85 | 75 | 75 | 65 | — |
| V | 60 | — | 100% | — | — | — | — | — | 65 |
| VI | — | — | — | 100% | — | — | — | — | — |
| VII | — | — | — | — | 15 | 25 | 15 | 25 | 25 |

[a]control
[b]Kraton GXT-0650, Shell Chemical Co.
[c]Kraton 4119, Shell Chemical Co.
[d]Dylark 231, Sinclair Koppers (6.8% maleic anhydride)
[e]Dylene 805
[f]Impact grade Dylark 250
[g]Acryloid KM 611

The compositions described in Table 1 were evaluated for physical properties and the results are reported in Table 2.

TABLE 2

| | 1 | 2 | 3 | 4 | 5 | 6 | 7 | 8 | 9 |
|---|---|---|---|---|---|---|---|---|---|
| Notched Izod Imp. (ft. lb./in.n) | 0.75 | 1.06 | 2.46 | 5.89 | 1.38 | 0.54 | 3.8 | 1.1 | 4.0 |
| Heat Distortion Temperature (° F) | 205 | 201 | 219 | 223 | 203 | 189 | 183 | 198–200 | 198 |
| Gardner Impact (in./lb.) | 45 | 47 | 114 | 225 | 46 | — | — | — | — |
| Tensile Strength (psi) | 6600 | 5660 | 7720 | 6540 | 5500 | 5700 | 4400 | 6200 | 5500 |
| Elongation (%) | 7.7 | 8.9 | 13 | 21 | 8.9 | 34 | 48 | 32 | 21 |
| | 10 | 11 | 12 | 13 | 14 | 15 | 16 | 17 | 18 |
| Notched Izod Imp. (ft. lb./in.n) | 6.9 | 0.26 | 3.2 | 1.28 | 0.24 | 0.41 | 0.32 | 0.40 | 0.40 |
| Heat Distortion Temperature | 185– | 194– | | | 208– | | 216– | 217– | 206– |

TABLE 2-continued

| (° F) | 187 | 198 | 176 | 204 | 209 | 208 | 218 | 218 | 207 |
|---|---|---|---|---|---|---|---|---|---|
| Gardner Impact (in./lb.) | — | 4.0 | 44.8 | 3.0 | — | — | — | — | — |
| Tensile Strength (psi) | 5400 | — | — | — | 8500 | 8100 | 9600 | 8800 | 8500 |
| Elongation (%) | 52 | — | — | — | 6.1 | 9.1 | 9.6 | 20 | 24 |

An analysis of this Table shows that the compositions of this invention have good impact strengths and relatively high heat distortion temperature.

Other compositions may be prepared by using the following materials:

A. styrene-maleic anhydride copolymer prepared according to Example II, run 10 of U.S. Pat. No. 3,336,267.
B. A-B-A block copolymer prepared according to run B of U.S. Pat. No. 3,431,323.
C. A'-B'-A' block copolymer of styrene-butadiene-styrene prepared according to Example II of U.S. Pat. No. 3,265,765.
D. emulsion graft polymerization product of an acrylic monomer and a rubbery diene copolymer as prepared in U.S. Pat. No. 2,943,074, column 4, emulsified polymer "B".

EXAMPLE II

The following compositions were prepared using procedures analogous to those employed in Example I:

| Components (parts by weight) | Sample No. | | | | | |
|---|---|---|---|---|---|---|
| | 19 | 20 | 21 | 22 | 23 | 24 |
| I poly(2,6-dimethyl-1,4-phenylene) ether (PPO, General Electric Co.) | — | 10 | — | 10 | — | 10 |
| II A-B-A copolymer$^a$ | 70 | 60 | — | — | — | — |
| III A'-B'-A' copolymer$^b$ | — | — | — | — | 30 | 30 |
| IV emulsion graft polymerization product of an acrylic monomer on a rubbery diene polymer$^c$ | — | — | 25 | 25 | — | — |
| V styrene-maleic anhydride copolymer$^d$ | 30 | 30 | 75 | 65 | 70 | 60 |

$^a$Kraton GXT-0650, Shell Chemical Co.
$^b$Kraton 4119, Shell Chemical Co.
$^c$Acryloid KM 611 Rohm & Haas.
$^d$Dylark 232, Sinclair Koppers; crystal grade.

The compositions of Example II were evaluated for physical properties and the results are reported in Table 3.

TABLE 3

| | 19 | 20 | 21 | 22 | 23 | 24 |
|---|---|---|---|---|---|---|
| Notched Izod Imp. (ft.lb./in.n) | 1.3 | 7.7 | 0.4 | 0.4 | 2.4 | 5.5 |
| Heat Distortion Temp. (° F) | — | — | — | — | — | — |
| Gardner Impact (in./lb.) | 63 | 155 | 10 | 10 | 65 | 81 |
| Tensile Strength (psi) | 5700 | 6100 | 8100 | 8500 | 4000 | 4700 |

Obviously other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic molding composition which comprises:

(a) from 40–95 parts by weight of a copolymer of a vinyl aromatic compound and an α,β-unsaturated cyclic anhydride;
   (b) from 10–50 parts by weight of a hydrogenated block copolymer of the A-B-A type wherein prior to hydrogenation; A is a polymerized mono-alkenyl aromatic hydrocarbon block; B is a polymerized conjugated diene hydrocarbon block; the blocks A constituting 2–50 weight percent of the copolymer; and,
   (c) from 0–50 parts by weight of a polyphenylene ether resin.

2. A composition as defined in claim 1 wherein said composition includes from 5–20 parts by weight of a polyphenylene ether of the formula:

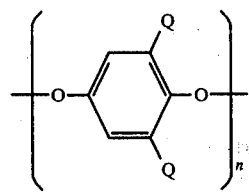

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus.

3. A composition as defined in claim 1 wherein said composition includes a hydrogenated block copolymer of the A-B-A type wherein prior to hydrogenation:

i. A is a polymerized mono-alkenyl aromatic hydrocarbon block having an average molecular weight of about 4,000–115,000;
   ii. B is a polymerized conjugated diene hydrocarbon block having an average molecular weight of about 20,000–450,000;
   iii. the blocks A constituting 2–33 weight percent of the copolymer;
   iv. 35–55% of the conjugated diene carbon atoms in block B being vinyl side chains;
   v. and the unsaturation of block B having been reduced to less than 10% of the original unsaturation.

4. A composition as defined in claim 1 wherein said composition includes a block copolymer of the A'-B'-A' type wherein A' are polymerized mono-alkenyl aromatic hydrocarbon block having molecular weights of 2,000–100,000, respectively, and B' is a polymerized conjugated diene hydrocarbon block having a molecular weight of from 25,000–1,000,000.

5. A composition as defined in claim 1 wherein the copolymer of a vinyl aromatic compound and an unsaturated cyclic anhydride is based on a vinyl aromatic compound of the formula:

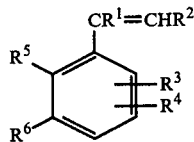

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom.

6. A composition as defined in claim 1 where said copolymer of a vinyl aromatic compound and an α,β-unsaturated cyclic anhydride comprises from 40 to 1 mole percent of the α,β-unsaturated cyclic anhydride and from 60 to 99 mole percent of a vinyl aromatic compound.

7. A composition as defined in claim 4 which contains from 5–30 parts by weight of said poly(2,6-dimethyl-1,4-phenylene) ether; and from 40–80 parts by weight of a copolymer of styrene-maleic anhydride.

8. A composition as defined in claim 3 which contains from 5–30 parts by weight of poly(2,6-dimethyl-1,4-phenylene) ether and from 40–80 parts by weight of a copolymer of styrene-maleic anhydride.

9. A composition as defined in claim 1 which contains 0% of the polyphenylene ether component.

10. A thermoplastic molding composition which comprises from 60–75 parts by weight of a copolymer of styrene-maleic acid anhydride, from 10–40 parts by weight of a hydrogenated block copolymer of the A-B-A type wherein prior to hydrogenation:
   i. A is a polymerized mono-alkenyl aromatic hydrocarbon block;
   ii. B is a polymerized conjugated diene hydrocarbon block;
   iii. the blocks A constituting 2–33 weight percent of the copolymer;
   iv. and the unsaturation of block B having been reduced to less than 10% of the original unsaturation; and
   from 5–30 parts by weight of a polyphenylene ether resin.

11. A thermoplastic molding composition which consists essentially of:
   (a) from 40–95 parts by weight of a copolymer of a vinyl aromatic compound and an α,β-unsaturated cyclic anhydride;
   (b) from 10–50 parts by weight of a block copolymer that is a hydrogenated block copolymer of the A-B-A type wherein prior to hydrogenation; A is a polymerized mono-alkenyl aromatic hydrocarbon block; B is a polymerized conjugated diene hydrocarbon block; the blocks A constituting 2–50 weight percent of the copolymer.

12. The composition of claim 11 wherein the vinyl aromatic compound is styrene, the α,β-unsaturated anhydride is maleic anhydride, A is a styrene block and B is a butadiene block.

* * * * *